US012036784B2

(12) United States Patent
Ryberg et al.

(10) Patent No.: US 12,036,784 B2
(45) Date of Patent: Jul. 16, 2024

(54) GLOSSY PRINTING

(71) Applicant: Välinge Innovation AB, Viken (SE)

(72) Inventors: Melker Ryberg, Malmö (SE); Disa Wigblad, Helsingborg (SE); Andreas Slottemo, Helsingborg (SE); Göran Ziegler, Viken (SE)

(73) Assignee: Välinge Innovation AB, Viken (SE)

( * ) Notice: Subject to any disclaimer, the term of this patent is extended or adjusted under 35 U.S.C. 154(b) by 87 days.

(21) Appl. No.: 17/369,202

(22) Filed: Jul. 7, 2021

(65) Prior Publication Data

US 2022/0009248 A1    Jan. 13, 2022

(30) Foreign Application Priority Data

Jul. 9, 2020 (SE) .................................... 2050873-5

(51) Int. Cl.
*B41J 11/00* (2006.01)
*C09D 7/42* (2018.01)
*C09D 11/322* (2014.01)
*C09D 11/40* (2014.01)
*G01N 21/57* (2006.01)

(52) U.S. Cl.
CPC ............. *B41J 11/0015* (2013.01); *C09D 7/42* (2018.01); *C09D 11/322* (2013.01); *C09D 11/40* (2013.01); *G01N 21/57* (2013.01)

(58) Field of Classification Search
CPC ..... B32B 21/02; B32B 21/14; B32B 2607/00; B32B 2471/00; B32B 2255/26; B32B 38/145; B32B 38/06; B41J 3/4073; B41J 3/407; B41M 7/0054; B05D 5/00; B05D 1/00; E04F 13/0866; E04B 2/00
See application file for complete search history.

(56) References Cited

U.S. PATENT DOCUMENTS

| | | |
|---|---|---|
| 4,530,856 A | 7/1985 | Kauffman et al. |
| 4,689,259 A | 8/1987 | Miller, Jr. et al. |
| 7,811,489 B2 | 10/2010 | Pervan |
| 8,349,234 B2 | 1/2013 | Ziegler et al. |
| 8,349,235 B2 | 1/2013 | Pervan et al. |
| 8,419,877 B2 | 4/2013 | Pervan et al. |
| 8,431,054 B2 | 4/2013 | Pervan et al. |
| 8,480,841 B2 | 7/2013 | Pervan et al. |
| 8,481,111 B2 | 7/2013 | Ziegler et al. |
| 8,617,439 B2 | 12/2013 | Pervan et al. |
| 8,663,785 B2 | 3/2014 | Ziegler et al. |
| 8,728,564 B2 | 5/2014 | Ziegler et al. |
| 8,784,587 B2 * | 7/2014 | Lindgren .............. B44C 3/005 52/309.3 |
| 8,920,874 B2 | 12/2014 | Ziegler et al. |
| 8,920,876 B2 | 12/2014 | Vetter et al. |
| 8,993,049 B2 | 3/2015 | Pervan |
| 9,079,212 B2 | 7/2015 | Pervan et al. |
| 9,085,905 B2 | 7/2015 | Persson et al. |
| 9,181,698 B2 | 11/2015 | Pervan et al. |
| 9,255,405 B2 | 2/2016 | Pervan et al. |
| 9,279,058 B2 | 3/2016 | Pervan et al. |
| 9,296,191 B2 | 3/2016 | Pervan et al. |
| 9,321,925 B2 | 4/2016 | Pervan et al. |
| 9,352,499 B2 | 5/2016 | Ziegler et al. |
| 9,371,456 B2 | 6/2016 | Pervan et al. |
| 9,403,286 B2 | 8/2016 | Vetter et al. |
| 9,410,319 B2 | 8/2016 | Ziegler et al. |
| 9,446,602 B2 | 9/2016 | Pervan |
| 9,528,011 B2 | 12/2016 | Pervan et al. |
| 9,556,622 B2 | 1/2017 | Pervan et al. |
| 9,630,404 B2 | 4/2017 | Pervan et al. |
| 9,670,371 B2 | 6/2017 | Pervan et al. |
| 9,738,095 B2 | 8/2017 | Pervan et al. |
| 9,783,996 B2 | 10/2017 | Pervan et al. |
| 9,873,803 B2 | 1/2018 | Pervan et al. |
| 10,016,988 B2 | 7/2018 | Pervan et al. |
| 10,017,950 B2 | 7/2018 | Pervan |
| 10,029,484 B2 | 7/2018 | Pervan et al. |
| 10,035,358 B2 | 7/2018 | Pervan et al. |
| 10,041,212 B2 | 8/2018 | Pervan |
| 10,100,535 B2 | 10/2018 | Pervan et al. |
| 10,189,281 B2 | 1/2019 | Pervan et al. |
| 10,214,913 B2 | 2/2019 | Persson et al. |
| 10,286,633 B2 | 5/2019 | Lundblad et al. |
| 10,315,219 B2 | 6/2019 | Jacobsson |
| 10,344,379 B2 | 7/2019 | Pervan et al. |
| 10,364,578 B2 | 7/2019 | Pervan |
| 10,369,814 B2 | 8/2019 | Pervan et al. |
| 10,384,471 B2 | 8/2019 | Pervan et al. |
| 10,392,812 B2 | 8/2019 | Pervan |

(Continued)

FOREIGN PATENT DOCUMENTS

WO    WO 2011/129757 A1    10/2011

OTHER PUBLICATIONS

International Search Report and Written Opinion mailed Oct. 13, 2021 in PCT/SE2021/050691, ISA/SE Patent-och registreringsverket, Stockholm, SE, 16 pages.

*Primary Examiner* — John Zimmermann
(74) *Attorney, Agent, or Firm* — Boone IP Law

(57) ABSTRACT

A method for modifying the degree of gloss of a surface. The method including the steps of a) providing an object; b) applying to at least one surface of the object, a powder composition comprising a thermosetting binder; c) applying onto the at least one surface of the resulting object in b), a fluid composition; and d) applying heat and pressure to the resulting surface from c) with a press plate in a pressing device.

32 Claims, No Drawings

(56) References Cited

U.S. PATENT DOCUMENTS

| | | |
|---|---|---|
| 10,414,173 B2 | 9/2019 | Pervan |
| 10,442,152 B2 | 10/2019 | Schulte |
| 10,442,164 B2 | 10/2019 | Schulte |
| 10,493,729 B2 | 12/2019 | Pervan et al. |
| 10,513,094 B2 | 12/2019 | Persson et al. |
| 10,556,447 B2 | 2/2020 | Pervan et al. |
| 10,596,837 B2 | 3/2020 | Pervan et al. |
| 10,723,147 B2 | 7/2020 | Pervan et al. |
| 10,800,186 B2 | 10/2020 | Pervan et al. |
| 10,828,881 B2 | 11/2020 | Bergelin et al. |
| 10,857,765 B2 | 12/2020 | Schulte |
| 10,899,166 B2 | 1/2021 | Pervan et al. |
| 10,913,176 B2 | 2/2021 | Lindgren et al. |
| 10,926,509 B2 | 2/2021 | Schulte |
| 10,981,362 B2 | 4/2021 | Ziegler et al. |
| 10,988,901 B2 | 4/2021 | Pervan |
| 10,988,941 B2 | 4/2021 | Ziegler et al. |
| 11,014,378 B2 | 5/2021 | Pervan et al. |
| 11,040,371 B2 | 6/2021 | Jacobsson |
| 11,046,063 B2 | 6/2021 | Håkansson et al. |
| 11,065,889 B2 | 7/2021 | Pervan |
| 11,072,156 B2 | 7/2021 | Schulte |
| 11,090,972 B2 | 8/2021 | Persson et al. |
| 11,130,352 B2 | 9/2021 | Pervan et al. |
| 11,135,814 B2 | 10/2021 | Pervan et al. |
| 11,167,533 B2 | 11/2021 | Ziegler et al. |
| 11,203,224 B2 * | 12/2021 | Ripley .................. G06F 3/1244 |
| 11,235,565 B2 | 2/2022 | Pervan et al. |
| 11,285,508 B2 | 3/2022 | Pervan et al. |
| 2005/0176321 A1 * | 8/2005 | Crette ....................... B32B 5/18 |
| | | 442/154 |
| 2008/0266371 A1 | 10/2008 | Ma et al. |
| 2009/0145066 A1 | 6/2009 | Pervan |
| 2009/0155612 A1 | 6/2009 | Pervan et al. |
| 2010/0092731 A1 | 4/2010 | Pervan et al. |
| 2010/0192793 A1 * | 8/2010 | Verhaeghe ............ B44C 5/0469 |
| | | 283/117 |
| 2010/0291397 A1 | 11/2010 | Pervan et al. |
| 2010/0300030 A1 | 12/2010 | Pervan et al. |
| 2010/0323187 A1 | 12/2010 | Kalwa |
| 2011/0171460 A1 * | 7/2011 | Endesfelder .............. B32B 7/05 |
| | | 977/773 |
| 2011/0175251 A1 | 7/2011 | Ziegler et al. |
| 2011/0177319 A1 | 7/2011 | Ziegler et al. |
| 2011/0177354 A1 | 7/2011 | Ziegler et al. |
| 2011/0189448 A1 | 8/2011 | Lindgren et al. |
| 2011/0247748 A1 | 10/2011 | Pervan et al. |
| 2011/0250404 A1 | 10/2011 | Pervan et al. |
| 2011/0293906 A1 | 12/2011 | Jacobsson |
| 2012/0263878 A1 | 10/2012 | Ziegler et al. |
| 2012/0263965 A1 * | 10/2012 | Persson .................... B27K 5/02 |
| | | 427/209 |
| 2012/0264853 A1 | 10/2012 | Ziegler et al. |
| 2012/0308774 A1 | 12/2012 | Håkansson et al. |
| 2013/0043211 A1 * | 2/2013 | Vermeulen ............ B05D 3/067 |
| | | 427/256 |
| 2013/0092314 A1 | 4/2013 | Zeigler et al. |
| 2013/0095315 A1 | 4/2013 | Pervan et al. |
| 2013/0189534 A1 | 7/2013 | Pervan et al. |
| 2013/0269863 A1 | 10/2013 | Pervan et al. |
| 2013/0273244 A1 | 10/2013 | Vetter et al. |
| 2013/0273245 A1 | 10/2013 | Ziegler et al. |
| 2014/0017452 A1 | 1/2014 | Pervan et al. |
| 2014/0023832 A1 | 1/2014 | Pervan et al. |
| 2014/0028772 A1 | 1/2014 | Pervan |
| 2014/0044872 A1 | 2/2014 | Pervan |
| 2014/0075874 A1 | 3/2014 | Pervan et al. |
| 2014/0171554 A1 | 6/2014 | Ziegler et al. |
| 2014/0178630 A1 | 6/2014 | Pervan et al. |
| 2014/0186610 A1 | 7/2014 | Pervan |
| 2014/0196618 A1 | 7/2014 | Pervan et al. |
| 2014/0198168 A1 | 7/2014 | Pervan et al. |
| 2014/0198170 A1 | 7/2014 | Pervan et al. |
| 2014/0199495 A1 | 7/2014 | Pervan et al. |
| 2014/0199513 A1 | 7/2014 | Pervan et al. |
| 2014/0199531 A1 | 7/2014 | Pervan et al. |
| 2014/0199558 A1 | 7/2014 | Pervan et al. |
| 2014/0220318 A1 | 8/2014 | Pervan |
| 2014/0234531 A1 | 8/2014 | Ziegler et al. |
| 2015/0017461 A1 | 1/2015 | Lindgren et al. |
| 2015/0079280 A1 | 3/2015 | Vetter et al. |
| 2015/0093502 A1 | 4/2015 | Ziegler et al. |
| 2015/0111055 A1 | 4/2015 | Persson et al. |
| 2015/0159382 A1 | 6/2015 | Pervan |
| 2015/0197942 A1 | 7/2015 | Pervan et al. |
| 2015/0197943 A1 | 7/2015 | Ziegler et al. |
| 2015/0239230 A1 * | 8/2015 | Vermeulen .............. B41F 19/02 |
| | | 101/27 |
| 2015/0274997 A1 | 10/2015 | Pervan et al. |
| 2015/0275526 A1 | 10/2015 | Persson et al. |
| 2015/0298433 A1 | 10/2015 | Kalwa |
| 2016/0031189 A1 | 2/2016 | Pervan et al. |
| 2016/0114495 A1 | 4/2016 | Pervan et al. |
| 2016/0144612 A1 | 5/2016 | Pervan et al. |
| 2016/0186318 A1 | 6/2016 | Pervan et al. |
| 2016/0208116 A1 | 7/2016 | Pervan et al. |
| 2016/0230400 A9 | 8/2016 | Pervan et al. |
| 2016/0250853 A1 | 9/2016 | Pervan et al. |
| 2016/0325559 A1 | 11/2016 | Pervan et al. |
| 2016/0368180 A1 | 12/2016 | Ziegler et al. |
| 2016/0368280 A1 | 12/2016 | Pervan |
| 2016/0369507 A1 | 12/2016 | Pervan |
| 2016/0375674 A1 | 12/2016 | Schulte |
| 2017/0066255 A1 | 3/2017 | Pervan et al. |
| 2017/0120564 A1 | 5/2017 | Schulte |
| 2017/0165936 A1 | 6/2017 | Schulte |
| 2017/0190156 A1 | 7/2017 | Ziegler et al. |
| 2017/0204281 A1 | 7/2017 | Pervan et al. |
| 2017/0232761 A1 | 8/2017 | Pervan et al. |
| 2017/0305119 A1 | 10/2017 | Bergelin et al. |
| 2017/0348984 A1 | 12/2017 | Pervan et al. |
| 2018/0002934 A1 | 1/2018 | Pervan et al. |
| 2018/0111390 A1 | 4/2018 | Pervan et al. |
| 2018/0127605 A1 | 5/2018 | Pervan et al. |
| 2018/0178553 A1 | 6/2018 | Pervan |
| 2018/0291638 A1 | 10/2018 | Pervan |
| 2018/0298216 A1 | 10/2018 | Pervan et al. |
| 2018/0320321 A1 | 11/2018 | Pervan |
| 2018/0370278 A1 | 12/2018 | Persson et al. |
| 2019/0010711 A1 | 1/2019 | Pervan et al. |
| 2019/0077043 A1 * | 3/2019 | Espe ..................... B27N 3/203 |
| 2019/0119513 A1 | 4/2019 | Pervan et al. |
| 2019/0202178 A1 | 7/2019 | Ziegler |
| 2019/0210329 A1 | 7/2019 | Ziegler et al. |
| 2019/0210330 A1 | 7/2019 | Ziegler et al. |
| 2019/0277039 A1 | 9/2019 | Persson et al. |
| 2019/0284819 A1 | 9/2019 | Pervan et al. |
| 2019/0284821 A1 | 9/2019 | Pervan |
| 2019/0292796 A1 | 9/2019 | Pervan et al. |
| 2019/0338534 A1 | 11/2019 | Pervan |
| 2019/0345348 A1 | 11/2019 | Pervan et al. |
| 2019/0351685 A1 | 11/2019 | Pervan |
| 2020/0055287 A1 | 2/2020 | Lundblad et al. |
| 2020/0078825 A1 | 3/2020 | Jacobsson |
| 2020/0079059 A1 | 3/2020 | Schulte |
| 2020/0079114 A1 | 3/2020 | Pervan et al. |
| 2020/0094512 A1 | 3/2020 | Schulte |
| 2020/0139726 A1 | 5/2020 | Pervan et al. |
| 2020/0164622 A1 | 5/2020 | Pervan et al. |
| 2020/0171849 A1 | 6/2020 | Pervan et al. |
| 2020/0215799 A1 | 7/2020 | Hedlund et al. |
| 2020/0223197 A1 | 7/2020 | Hedlund et al. |
| 2021/0001647 A1 | 1/2021 | Pervan et al. |
| 2021/0008863 A1 | 1/2021 | Bergelin et al. |
| 2021/0070065 A1 | 3/2021 | Pervan et al. |
| 2021/0078305 A1 | 3/2021 | Schulte |
| 2021/0101310 A1 | 4/2021 | Lindgren et al. |
| 2021/0197534 A1 | 7/2021 | Ziegler et al. |
| 2021/0214898 A1 | 7/2021 | Pervan |
| 2021/0277670 A1 | 9/2021 | Ziegler et al. |
| 2021/0323297 A1 | 10/2021 | Slottemo et al. |
| 2021/0379907 A1 | 12/2021 | Pervan et al. |

(56) References Cited

U.S. PATENT DOCUMENTS

| | | |
|---|---|---|
| 2022/0024189 A1 | 1/2022 | Ziegler et al. |
| 2022/0024195 A1 | 1/2022 | Schulte |
| 2022/0063326 A1 | 3/2022 | Persson et al. |

* cited by examiner

GLOSSY PRINTING

CROSS REFERENCE TO RELATED APPLICATIONS

The present application claims the benefit of Swedish Application No. 2050873-5, filed on Jul. 9, 2020. The entire contents of Swedish Application No. 2050873-5 are hereby incorporated herein by reference in their entirety.

TECHNICAL FIELD

The present application relates to methods of altering or modifying the gloss of a surface. Products or objects obtainable by the methods of the application are also described herein. These products or objects may comprise at least one surface which further comprises a pressed power or an overlay paper wherein a fluid composition is encapsulated.

BACKGROUND ART

In the art various methods have been presented which relate to the application of a glossy surface layer on a substrate. One example is seen in US 2008/266371, which relates to a system and associated methods for printing matte and glossy images on a glossy media substrate comprising an ink set that comprises at least one pigmented ink-jet ink including an anionic surface charged pigment dispersed in a first liquid vehicle and a substantially colourless matting liquid with at least one matting agent dispersed or solvated in a second liquid vehicle. Additionally, when the pigmented ink-jet ink is printed on the glossy media substrate alone, the pigmented ink-jet ink has a glossy appearance, and wherein when the colourless matting liquid is overprinted or underprinted with respect to the pigmented ink-jet ink on the glossy media substrate, the pigmented ink-jet ink combined with the matting liquid exhibits a visually perceptible matte appearance compared to the glossy appearance of the ink-jet ink printed alone.

Furthermore, it is known in the art to employ UV-varnish or XYMER-technology to alter the degree of gloss of a surface.

SUMMARY OF THE INVENTION

An aspect of the present application relates to modifying the glossy appearance of a surface and specifically methods for altering or modifying the degree of gloss of a surface. In more detail, the invention relates to a method for modifying the degree of gloss of a surface, the method comprising the steps of:
  a) providing an object;
  b) applying a powder composition comprising a thermosetting binder to at least one surface of the object;
  c) applying onto the powder composition on the at least one surface of the object a fluid composition;
  d) applying heat and pressure to the at least one surface resulting from c) with a press plate in a pressing device.

Any of the methods described herein may be employed or adapted into existing productions lines already in use in any type of industry, or alternatively, the methods described herein may be used in any specially designed machinery.

In another aspect, the present application relates to modifying the glossy appearance of a surface and methods in relation thereto, wherein the method comprises the steps of:
  i) providing a sheet comprising a melamine resin;
  ii) applying a fluid composition onto the sheet in i);
  iii) applying the resulting sheet in ii) onto a surface of an object;
  iv) optionally heating the resulting surface of the object by suitable means;
  v) applying heat and pressure to the resulting surface of the object in iii) or iv) with a pressing device.

In another aspect, present application relates to an object obtainable by any of the methods described herein.

In yet a further aspect, the present application relates to an object comprising at least one surface, which further comprises a pressed powder wherein a fluid composition may be encapsulated. The area comprising the encapsulated fluid provides for a matt or lusterless appearance to the surface.

DETAILED DESCRIPTION OF THE INVENTION

Methods described herein relate to modifying the glossy appearance of a surface and specifically to altering or modifying the degree of gloss of the surface. In more detail, the methods for modifying the degree of gloss of a surface may comprise the steps of:
  a) providing an object;
  b) applying a powder composition comprising a thermosetting binder to at least one surface of the object;
  c) applying onto the powder composition on the at least one surface of the object a fluid composition;
  d) applying heat and pressure to the resulting surface from c) with a press plate in a pressing device.

Any of the methods described herein may be employed or adapted into existing productions lines already in use in any type of industry, or alternatively, the methods may be used in any specially designed machinery.

Apart from the above mentioned advantage, the methods described herein provide a more effective process for producing a surface with varying degrees of gloss such that the surface comprises several different degrees of gloss.

The methods also provide a simplified procedure requiring minimal modification to existing production machinery and/or a possible addition to a simple machine or production unit into a production line. The methods also provide a shorter procedure in producing glossy surfaces or partially glossy surfaces. This may include preparing the surfaces in fewer method steps when compared to the processes taught in the art.

One advantage that the methods offer is a higher degree of flexibility by allowing control of the degree of glossiness with a print without the need of creating specific templates to achieve various degrees of gloss on the surface of an object.

Thus, the methods can also provide surfaces comprising glossiness of varying degrees, wherein the resulting surfaces have high durability and resistance against wear and tear.

The methods disclosed herein may be part of a larger series of production methods or steps or may be a single production method. In any of the methods described herein, the method may comprise a pressing step. The pressing itself may be conducted by any conventional method in the art such as, e.g., a pressing plate. The pressing plate may be part of a pressing device of any kind. The pressing device may be static or may be a continuous press. Thus, the methods described herein may be part of a continuous production or preparation step. The methods may also be part of a static production or preparation process.

The object employed in the methods herein may in principle be any type of object commonly used in the art. In one embodiment, the object comprises a surface which is to be manipulated by the methods described herein. The object may made from a material commonly used in the art such as wood, paper or cellulose, fiber, cement, or any type of polymer. The object may also comprise many types of different materials and may consequently comprise any combination of materials such as, e.g., a combination of at least two of the following: wood, paper, concrete like materials, or any type of polymer. The object may be a MDF, HDF, particle board, plywood or lamella core.

In one embodiment, the object comprises a solid wood-based material, such as a wood veneer or a wood panel of any desirable thickness.

In another embodiment, the object comprises a paper sheet or other cellulose material, such as cotton-based material, hemp-based material or bagasse-based material. The object may be in the shape of a solid sheet or a powder composition.

In one embodiment, the object is a floorboard or tile.

In another embodiment, the object comprises a material based on magnesium oxide such as, e.g., magnesium oxide boards (MGO boards).

The structure of the surface of the object prior to undergoing the methods described herein may be completely plane without any porous structure or may be coarse or rough with a potentially also with a porous structure, or the surface may be in any degree from completely plane without any porous structure to coarse or rough with potentially a porous structure.

In one embodiment, the surface of the object prior to undergoing the methods described herein is essentially plane without any porous structure on the surface. In other embodiments the surface of the object prior to undergoing the methods described herein comprises a microstructure which results in the surface being shiny or reflective or even mirror like in appearance.

After the object has undergone the methods described herein, the surface of the object is at least partially made mat or lusterless in comparison to areas of the object which are not treated by the methods. Consequently, the fluid composition may thus be applied to selected parts of the surface of the object. The selected parts of the surface of the object will be made mat or lusterless once subjected to the methods described herein.

Gloss Measurements

As is known in the art, gloss is an important embodiment of our visual perception of objects. The perception of gloss can relate to a product's finish, texture and how a sample is illuminated and viewed. Surfaces with high reflectance are perceived as glossy, shiny or lustrous, whilst less reflective surfaces are perceived as semi-gloss, lusterless or matt. Gloss can be measured by several different techniques known in the art. One example is by using an optical instrument (gloss meter). Gloss is measured by directing a constant intensity light beam, at a fixed angle, on to the test surface and then monitoring the amount of reflected light from the same angle. This specular reflectance is measured using a gloss meter. A glossmeter provides quantifiable gloss measurements, expressed as gloss units (GU).

Surfaces with a brilliant or highly polished finish reflect images clearly. This distinct reflection is caused by the incident light reflecting on the surface in a specular direction. In contrast, semi and matt surfaces reflect images less distinctly and with reduced intensity. On semi or matt surfaces light not only reflects in a specular direction but also is scattered causing the reflected image to appear diffused.

Gloss measurement is based on the amount of light reflected on the surface relative to a polished glass reference standard, measured in Gloss Units (GU). The amount of light that is reflected on the surface is dependent on the angle of incidence and the properties of the surface.

Gloss is categorized as either matt, semi or high gloss. In order to determine the most appropriate measurement angle a measurement is usually started with a glossmeter set at a 60° angle of incidence. If the result is between 10-70 GU, the coating is termed 'semi-gloss' and should be measured using the 60° angle on the glossmeter. If the result is less than 10 GU, the product is 'low gloss' and should be measured using the 85° angle on the glossmeter and if it is greater than 70 GU, the product is known as 'high gloss' and should be measured using the 20° angle on the glossmeter. All three angles should be recorded (20, 60 &85°) when measuring gloss on anodized metals to ensure a complete understanding of the specular reflectance between the coating and the metal substrate. A list is shown below illustrating the various criteria for gloss ranges.

| Gloss Range | 60° value | Measure with |
| --- | --- | --- |
| High Gloss | >70 GU | 20° |
| Semi Gloss | 10-70 GU | 60° |
| Low/Matt | <10 GU | 85° |

Reflectance

Whilst the Gloss Unit (GU) scale is linear, each angle of incidence has a different measurement range; 0-2000 GU (20°), 0-1000 GU (60°), 0-160 GU (85°).

Reflectance compares the amount of light energy transmitted and received by a gloss meter and expresses the value as a percentage of the angle of incident's full measurement range and the value is displayed as a percentage relative to the selected angle of incidence. As the measurement range for a 20° gloss meter is 0-2000 GU; a value of 1000 GU at 20° would be expressed as 50%20, and a value of 500 GU would be expressed as 25%20. A value of 500 GU at 60° but would be expressed as 50%60 as the measurement range for the 60° is 0-1000 GU. The shinier a surface is, the closer the value will be to 100%. Materials with a high refractive index, such as clear plastics or varnishes, can have measurement values above 100 GU. Highly reflective metals can have gloss values up to 2000 GU. Furthermore, the measurement value may be increased for transparent materials due to multiple reflections in the bulk of the material. In all these cases, it is common to express the measurement results in % Reflectance.

Haze

Haze causes a drop in reflected contrast and causes 'halos' to appear around the reflected light sources, dramatically reducing the visual quality. In accordance with ASTM D4039, Haze may be defined as the numeric difference between the specular reflectance at 60° and 20°. This is expressed in Haze Units (HU).

As is apparent from the objectives of the application, the methods and products described herein accomplish a visible difference in gloss on a treated surface of an object. The difference in gloss may be measured by any of the techniques described herein and techniques known in the art.

Depending on how the fluid composition is applied, various well defined patterns may be obtained such that the parts of the surface of the object, onto which the fluid composition has been applied, contain a lower degree of gloss and will appear as semi-mat or mat after having been subjected to the methods described herein.

The powder composition may be applied to at least a part of the surface of the object. The powder composition may be applied onto the surface by technologies known in the art.

In one embodiment, the powder composition may comprise a thermosetting binder. The thermosetting binder may be any suitable thermosetting agent and/or amino resin, such as melamine formaldehyde resin or urea formaldehyde resin. Another example may be phenol formaldehyde resin.

In another embodiment, the binder may be a thermoplastic powder, such as a co-polymer of vinyl acetate-ethylene (VAE), for example Vinnapas®.

The powder composition may comprise various other components known in the art such as one or more fibre components, resins, or pigments. The powder composition may also comprise one or more fillers such as barium sulphate, various types of kaolin clay, talcum and/or chalk. In an embodiment the powder composition may comprise fibre components at an amount of at least 25 wt %. The amount of resin may be between 25-75 wt. %, preferably about 45-60 wt %, more preferably about 52.5 wt. %. The amount of pigment depends on which colour and may vary between 0.1-10 wt. %. Further, the amount of filler in the powder composition may be between 0-10 wt. %. Preferred is that the total amount of pigment and filler, combined, is below 10 wt. %. This is advantageous since the risk of unwanted effects such as chalking, flooding and blooming may be reduced.

In an alternative embodiment, the powder composition may comprise one or more of fibre components, such as cellulose fibres, resin, such as thermosetting binders (e.g., melamine-formaldehyde resin), colour pigments and/or metal oxides such as, e.g., $Al_2O_3$. In an embodiment the powder composition comprises fibre components at an amount of at least 25 wt %. The amount of resin may be between 25-75 wt. %, preferably about 45-60 wt %, more preferably about 52.5 wt. %. The amount of pigment depends on which colour and may vary between 0.1-10 wt. %. The amount of metal oxides may be between 2.5-15 wt. %, more preferably 5-10 wt. %.

In yet another embodiment, the powder composition may comprise one or more of fibre components, such as cellulose fibres, resin, such as thermosetting binders (e.g., melamine-formaldehyde resin), colour pigments, fillers and/or metal oxides, such as, e.g., $Al_2O_3$. In an embodiment the powder composition may comprise fibre components at an amount of at least 25 wt %. The amount of resin may be between 25-75 wt. %, preferably about 45-60 wt %, more preferably about 52.5 wt. %. The amount of pigment depends on which colour and may vary between 0.1-10 wt. %. Further, the amount of filler in the powder composition may be between 0-10 wt. %. Preferred is that the total amount of pigment and filler, combined, is below 10 wt. %. This is advantageous since the risk of unwanted effects such as chalking, flooding and blooming may be reduced. The amount of metal oxides may be between 2.5-15 wt. %, more preferably 5-10 wt. %.

The methods described herein may also comprise applying onto the at least one surface of the object a fluid composition. The amount of fluid composition applied may be between 5-25 ml/m², more preferably 9-14 ml/m². The fluid composition may be applied to the surface of the object, after a powder composition has been applied to the surface of the object. The fluid composition may be applied by any conventional method such as printing, digital printing, spraying or spraying through a template.

The fluid composition may comprise any monoethylene based fluid or ink based fluid composition, which may be a water based ink composition. The fluid composition may be clear/transparent or may have any degree of opaqueness. The fluid composition may be uncoloured or may have any desired colour.

The fluid composition may have a boiling temperature above the intended pressing temperature. For example, the boiling temperature may be at least 3° C. above the pressing temperature, at least 5° C. above, at least 10° C. above, or at least 20° C. above, and for example in a range of 3° to 50° C. above. For example, the fluid composition may have a boiling temperature of about 120° C. to about 250° C., about 160° C. to about 200° C., about 170° C. to about 210° C., or at a temperature of about 160° C., about 180° C., or about 200° C. For example the fluid composition may have a boiling temperature of about 187° C. to about 207° C., preferably about 197° C. For example the fluid composition may have a boiling temperature of about 178° C. to about 198° C., preferably 188° C. This is advantageous as the fluid composition will be encapsulated in the powder without evaporating during pressing since the boiling temperature is higher than the pressing temperature. The result is that the encapsulated fluid will give a different appearance, i.e. lowering the gloss.

The fluid composition may be applied to at least a part of the surface of the object. The fluid composition may be applied by various technologies such as spraying, printing or applying the fluid in any suitable manner, e.g., spraying through a scaffold or pattern grid or template. The fluid composition may be applied such that the surface comprises well defined areas or patterns of the fluid composition on the object. Consequently, the object may thus have surface areas comprising the applied fluid composition while other areas of the surface are free of the fluid composition. The fluid composition may thus be applied to form well defined patterns of any kind on the surface of the object. In another embodiment, the fluid composition may be applied to the entire surface of the object.

The methods may also comprise a pressing step. The pressing step may succeed the method step wherein the powder and fluid composition has been applied to the surface of the object. Consequently, the pressing step may be exemplified by a step d), wherein the resulting treated object wherein the surface of the object has been powder treated and subsequently, the fluid composition has been applied, is subjected to a pressing step. The pressing step may employ any type of suitable pressing device known in prior art. The pressing itself may be conducted using a pressing plate of any kind or suitable dimension.

The pressing step may be part of a continuous process, such as a continuous press device or a static press device.

The pressing step may be conducted at any suitable temperature. Thus, the pressing plate may be applied to the surface of the object at temperatures ranging from about 90° C. to about 300° C., such as about 100° C. to about 290° C., such as about 110° C. to about 280° C., such as about 120° C. to about 250° C., or such as about 160° C. to about 200° C.

In one embodiment, the temperature by which the object is heated may be any temperature in range of about 120° C. to about 250° C.

In another embodiment, the temperature by which the object is heated may be any temperature in range of about 160° C. to about 200° C.

In another embodiment, the temperature by which the object is heated may be any temperature in range of about 170° C. to about 210° C.

In another embodiment, the temperature by which the object is heated may be a temperature of about 160° C., or about 180° C., or about 200° C.

In one embodiment, the pressing temperature is below the boiling point of the fluid composition or just at the boiling point of the fluid composition.

The pressing step may be conducted by employing an elevated pressure, such that the pressing plate exerts a pressure on the surface of the object. The applied pressure may be any pressure in range of about 5 bar to about 150 bar, such as about 10 bar to about 100 bar, such as about 10 bar to about 90 bar, or such as about 30 bar to about 60 bar.

In one embodiment, the applied pressure is about 10 bar to about 90 bar.

In another embodiment, the applied pressure is about 30 bar to about 60 bar.

In another embodiment, the applied pressure is about 30 bar to about 50 bar.

In another embodiment, the applied pressure is about 40 bar to about 50 bar.

The pressing step may have any suitable duration of time. Consequently, the pressing may have a duration of time in the interval about 1 second to about 300 second, such as about 1 second to about 240 seconds, such as about 1 second to about 180 seconds, such as about 1 second to about 120 seconds, or such as about 10 seconds to about 60 seconds.

In one embodiment, the duration of the pressing is from about 1 second to about 120 seconds.

In another embodiment, the duration of the pressing is about 10 seconds to about 60 seconds.

In one embodiment, the duration of the pressing is about 8 seconds to about 120 seconds.

In one embodiment, the duration of the pressing is about 25 seconds to about 30 seconds.

It is to be understood that during the duration of the pressing step both pressure and heat is applied simultaneously. This causes a thermosetting of the components in the powder composition and further results in a hardening of the powder, thereby adhering the powder composition to the surface of the object.

After pressing, the surface of the object may have selected areas with a lower degree of gloss and areas of the surface with a higher degree of gloss.

A further aspect of the application relates to methods for modifying the degree of gloss of a surface. These methods may comprise the steps of;
i) providing a sheet or a carrier impregnated with a thermosetting binder, such as an overlay paper impregnated with a thermosetting binder;
ii) applying a fluid composition onto the sheet or carrier;
iii) applying the resulting sheet in ii) onto a surface of an object;
iv) optionally heating the resulting surface in step iii) of the object by suitable means;
v) applying heat and pressure to the resulting surface of the object in iii) or iv) with a pressing device.

The sheet may be of any suitable thickness and may be of any suitable material such as a cellulose based material like paper or thin sheets of wood, e.g., a wood veneer.

The sheet may also be based on any suitable polymer.

The pressing step may be conducted at a temperature in range of about 90° C. to about 300° C., such as about 100° C. to about 290° C., such as about 110° C. to about 280° C., such as about 120° C. to about 250° C., such as about 160° C. to about 200° C.

In one embodiment, the temperature at which the object is heated may be any temperature in range of about 120° C. to about 250° C.

In another embodiment, the temperature at which the object is heated may be any temperature in range of about 160° C. to about 200° C.

In another embodiment, the temperature at which the object is heated may be any temperature in range of about 170° C. to about 210° C.

In another embodiment, the temperature at which the object is heated may be a temperature of about 160° C., or about 180° C., or about 200° C.

In one embodiment, the pressing temperature at which the object is heated is below the boiling point of the fluid composition or just at the boiling point of the fluid composition.

The pressing step may be conducted by employing an elevated pressure, such that the pressing plate exerts a pressure on the surface of the object. The applied pressure may be any pressure in range of about 5 bar to about 150 bar, such as about 10 bar to about 100 bar, about 10 bar to about 90 bar, or about 30 bar to about 60 bar.

In one embodiment, the applied pressure is about 10 bar to about 90 bar.

In another embodiment, the applied pressure is about 30 bar to about 60 bar.

In another embodiment, the applied pressure is about 30 bar to about 50 bar.

In another embodiment, the applied pressure is about 40 bar to about 50 bar.

The pressing step may have any suitable duration of time. Consequently, the pressing may have a duration of time in the interval of about 1 second to about 300 second, such as about 1 second to about 240 seconds, about 1 second to about 180 seconds, about 1 second to about 120 seconds, or about 10 seconds to about 60 seconds.

In one embodiment, the duration of the pressing is about 1 second to about 120 seconds.

In another embodiment, the duration of the pressing is about 10 seconds to about 60 seconds.

In one embodiment, the duration of the pressing is about 8 seconds to about 120 seconds.

In one embodiment, the duration of the pressing is about 25 seconds to about 30 seconds.

The fluid composition applied to the sheet or carrier may be a fluid composition as described herein. The fluid composition may be applied by any conventional method such as printing or spraying onto the sheet.

The fluid composition may comprise any monoethylene based fluid or ink-based fluid composition, which may be a water-based ink composition. The fluid composition may be clear/transparent or may have any degree of opaqueness. The fluid composition may be uncoloured or may have any desired colour.

The fluid composition may have a boiling temperature above the intended pressing temperature. For example, the boiling temperature may be at least 3° C. above the pressing temperature, at least 5° C. above, at least 10° C. above, or at least 20° C. above, and for example in a range of 3° to 50° C. above. For example, the fluid composition may have a boiling temperature of about 120° C. to about 250° C., about 160° C. to about 200° C., about 170° C. to about 210° C., or at a temperature of about 160° C., about 180° C., or about 200° C. This is advantageous as the fluid composition will be encapsulated in the impregnated sheet without evaporating during pressing since the boiling temperature is higher than the pressing temperature. The result is that the encapsulated fluid will give a different appearance, i.e. lowering the gloss.

The fluid composition may be applied to at least a part of the sheet in order to create any desirable pattern or surface design. The fluid composition may be applied such that the surface of the sheet comprises well defined areas or patterns of the fluid composition. Consequently, the object may thus have surface areas comprising the applied fluid composition while other areas of the surface are free of the fluid composition. For example, 20-80%, such as 35-65%, of the surface area may be free of the fluid compositions. This makes it possible to create any type of surface design with the feature of gloss. Thus, the application of the fluid composition depends on the surface design to be made. After applying pressure and/or heat the surface areas where the fluid composition is present will have a different glossiness than the surface areas where the fluid composition is missing.

In another embodiment, the fluid composition may be applied to the entire surface of the sheet. This is advantageous if it is desirable to reduce the glossiness of the entire surface area.

The methods described herein may also comprise applying the sheet onto the surface of an object. Suitably, the sheet is applied to the surface of an object after the fluid composition has been applied to the sheet. The sheet may be applied onto the surface of the object by any suitable industrial means.

The heating may be performed by any suitable means such as IR irradiation or applying a heated jet air stream.

The methods described herein may also comprise pressing the resulting surface of the object, i.e. after the sheet has been applied onto the surface of an object and subsequently been subjected to an optional heating step. The pressing step may be conducted by employing a press plate in any suitable device known in the art, such as a press belt.

After pressing, the surface of the object may comprises select areas with a lower degree of gloss and areas of the surface with a higher degree of gloss.

The present application also relates to an object obtainable by the methods as described herein.

The object may be any desirable object wherein at least part of the surface is to be matt, semi-mat or otherwise have a lusterless pattern.

The object may have an essentially plane surface, such as, e.g., a floor board or a tile. The object may also be such that at least part of the object is essentially plane.

The object may comprise at least one surface which further comprises a pressed power wherein a fluid composition is encapsulated and wherein the area comprising the encapsulated fluid gives a matt or lusterless appearance to the surface.

Overall, the surface of the object after being treated by any of the methods described herein will comprise a matt, semi-matt, or lusterless appearance on the parts of the surface onto which the fluid composition was applied.

EXAMPLES

The following example is provided to better illustrate the methods and objects described herein. The example is not to be interpreted as limiting the scope of the application. To the extent that specific materials are mentioned, it is merely for purposes of illustration and not intended to limit the application. One skilled in the art may develop equivalent means or reactants without the exercise of inventive capacity and without departing from the scope of the application. It will be understood that many variations can be made in the procedures described herein while still remaining within the bounds of the present application. It is the intention of the inventors that such variations be included within the scope of the application.

Example 0—Only Powder

In the two below reference examples a surface with only a powder composition, including 53.4 wt. % melamine formaldehyde resin, 31.5 wt. % recycled wood fibres from HDF, where the fibres are grinded and sieved to 0-300 μm size, 9.4 wt. % aluminum oxide and 5.7 wt. % pigments, was pressed with a high gloss press plate, example 0a, and with a high gloss casting paper, example 0b. The amount of powder composition applied to the surface was 400 g/m². The gloss of the resulting surfaces was measured with a ZEHNTNER testing instrument, ZGM 1110. The tables below present the gloss measurements.

Example 0a—Pressed with a High Gloss Press Plate

To a piece of a wood-based board, a HDF, a powder composition, as previously disclosed, was applied. Heat and pressure were applied by a high gloss press plate to the surface with the following parameters: pressure 40 bar; pressing time 30 sec.; and pressing temperature 180° C. The gloss of the resulting surface was then measured, and the results can be seen in Table 1.

TABLE 1

| Example 0a | | | |
| --- | --- | --- | --- |
| Example 0a - only powder | 20° | 60° | 85° |
| Gloss (GU) | 16.0 | 55.1 | 65.4 |

Example 0b—Pressed with a High Gloss Casting Paper

To a piece of a wood-based board, a HDF, a powder composition, as previously disclosed, was applied. A high gloss casting paper was applied to the surface before applying heat and pressure. Heat and pressure were applied by a press plate to the high gloss casting paper and the surface with the following parameters: pressure 40 bar; pressing time 30 sec.; and pressing temperature 180° C. The gloss of the resulting surface was then measured, and the results can be seen in Table 2.

TABLE 2

| Example 0b | | | |
| --- | --- | --- | --- |
| Example 0b - only powder | 20° | 60° | 85° |
| Gloss (GU) | 8.2 | 44.0 | 48.2 |

Example 1—Powder Composition with a Fluid Composition Pressed with a High Gloss Press Plate In the three examples below, a surface with a powder composition, as disclosed in Example 0, and a fluid composition, wherein the fluid composition was Mexar Model Fluid purchased from Mexar the fluid (according to the safety data sheet) comprises >=50 wt. % ethylene glycol, distributed in three different ways are disclosed. The amount of fluid composition applied to the powder composition was 5 g/m$^2$. The surfaces were pressed with both a high gloss press plate, and with a high gloss casting paper. The gloss of the resulting surfaces was measured with a ZEHNTNER testing instrument, ZGM 1110. The tables below present the gloss measurements and the comparison to the relevant reference example.

Example 1a—Digital Printing

To a piece of a wood-based board, a HDF, a powder composition, as previously disclosed, was applied. To the resulting surface, a fluid composition was applied in form of an ink composition. In this first example the ink composition was applied to the surface by digital printing. In a first comparison, heat and pressure was applied to the surface by a high gloss press plate to create the resulting surface. In a second comparison, a high gloss casting paper was applied between the surface and the press plate before heat and pressure was applied to the surface by a standard press device, to create the resulting surface. The parameters for the heating and pressing process were: the top press plate had a temperature of 180° C. and the bottom press plate had a temperature of 180° C., a pressure of 40 bar was applied during 30 seconds.

TABLE 3

| Example 1a | | | |
|---|---|---|---|
| Example 1a - digital printing | 20° | 60° | 85° |
| Gloss (GU) | 11.3 | 44.9 | 56.2 |
| Difference comp. to Example 0a | −4.7 | −10.2 | −9.2 |
| Gloss (GU) | 4.1 | 29.8 | 37.9 |
| Difference comp. to Example 0b | −4.1 | −14.2 | −10.3 |

As can be seen by the results in the table, compared to the example 0a, the gloss was reduced in the surface areas where the ink composition was present. A reduction of at least 4% is a surprising amount of reduction. The digital printing allows to create a detailed and sharp surface design with, e.g., fine lines, which is preferred for, e.g., creating letters or numbers in the surface.

Example 1b—Analogue Printing

To a piece of a wood-based board, a HDF, a powder composition, as previously disclosed, was applied. To the resulting surface, a fluid composition was applied in form of an ink composition. In this second example the ink composition was applied to the surface by spraying the ink composition through a pattern template. In a first comparison, heat and pressure was applied to the surface by a high gloss press plate to create the resulting surface. In a second comparison, a high gloss casting paper was applied between the surface and the press plate before heat and pressure was applied to the surface by a standard press device, to create the resulting surface. The parameters for the heating and pressing process were: the top press plate had a temperature of 185° C. and the bottom press plate had a temperature of 180° C., a pressure of 40 bar was applied during 30 seconds.

TABLE 4

| Example 1b | | | |
|---|---|---|---|
| Example 1b - analogue printing | 20° | 60° | 85° |
| Gloss (GU) | 10.8 | 44.4 | 55.4 |
| Difference comp. to Example 0a | −5.2 | −10.7 | −10.0 |
| Gloss (GU) | 4.4 | 30.1 | 38.4 |
| Difference comp. to Example 0b | −3.8 | −13.9 | −9.8 |

As can be seen by the result in the table, compared to the example 0a, the gloss was reduced in the surface areas where the ink composition was present. A reduction of at least 3.8% is a surprising amount of reduction. The analogue printing allows to create a surface design with more basic structures and designs compared to the digital printing.

Example 1c—Rotational Spray Nozzle

To a piece of a wood-based board, a HDF, a powder composition, as previously disclosed, was applied. To the resulting surface, a fluid composition was applied in form of an ink composition. In this first example the ink composition was applied to the surface by employing a high rotational spray nozzle. In a first comparison, heat and pressure was applied to the surface by a high gloss press plate to create the resulting surface. In a second comparison, a high gloss casting paper was applied between the surface and the press plate before heat and pressure was applied to the surface by a standard press device, to create the resulting surface. The parameters for the heating and pressing process were: the top press plate had a temperature of 185° C. and the bottom press plate had a temperature of 180° C., a pressure of 40 bar was applied during 30 seconds.

TABLE 5

| Example 1c | | | |
|---|---|---|---|
| Example 1c - rotational spray nozzle | 20° | 60° | 85° |
| Gloss (GU) | 11.0 | 44.2 | 55.4 |
| Difference comp. to Example 0a | −5.0 | −10.9 | −10.0 |
| Gloss (GU) | 4.2 | 29.9 | 37.7 |
| Difference comp. to Example 0b | −4.0 | −14.1 | −10.5 |

As can be seen by the result in the table, compared to the example 0a, the gloss was reduced in the surface areas where the ink composition was present. A reduction of at least 4% is a surprising amount of reduction. The rotational spray nozzle distributes the ink composition homogenously over the surface area creating a resulting surface design where the gloss of the whole surface area is reduced.

Example 2—Impregnated Overlay Paper with a Fluid Composition

In a further example, an ink composition, wherein the ink composition was Mexar Model Fluid purchased from Mexar the fluid (according to the safety data sheet) comprises >=50 wt. % ethylene glycol, was applied onto an impregnated overlay paper by digital printing. The amount of applied fluid composition was 5 g/m$^2$. The impregnated overlay paper had a base paper weight of 25 g/m$^2$ and was impregnated with Melamine formaldehyde resin such that the impregnated paper weight was 100 g/m$^2$. The overlay paper was exposed to IR radiation in order to dry the applied ink composition. The resulting printed overlay paper was subsequently pressed onto a floor board, a HDF, by pressing the surface in a standard press device wherein top press plate had a temperature of 185° C., bottom press plate a temperature of 180° C., at 40 bar pressure for a duration of 30 seconds. The gloss of the resulting surfaces was measured with a ZEHNTNER testing instrument, ZGM 1110. The table below presents the gloss measurements.

TABLE 6

| Example 2 | | | |
|---|---|---|---|
| Example 2 - overlay paper | 20° | 60° | 85° |
| Gloss (GU) | 12.9 | 48.9 | 59.1 |

As can be seen from the above, the methods disclosed herein produce surfaces wherein, where the fluid composition has been applied, a matt or lusterless surface is formed.

The invention claimed is:

1. A method for modifying the degree of gloss of a surface, the method comprising the steps of:
   a) providing an object;
   b) applying a powder composition comprising a thermosetting binder to at least one surface of the object;
   c) applying onto the powder composition on the at least one surface of the object a fluid composition;
   d) applying heat and pressure to the resulting surface from c) with a press plate in a pressing device at a pressing temperature,
   wherein the fluid composition is uncolored and has a boiling temperature that is higher than the pressing temperature.

2. The method according to claim 1, wherein the pressing device is a continuous pressing device or a static pressing device.

3. The method according to claim 1, wherein the pressing step takes place under a temperature of about 120° C. to about 250° C.

4. The method according to claim 1, wherein the pressing step employs a pressure of about 10 bar to about 90 bar.

5. The method according to claim 1, wherein the pressing step has a duration of about 1 second to about 120 second.

6. The method according to claim 1, wherein the fluid composition is a monoethylene based fluid or a water based ink composition.

7. The method according to claim 1, wherein the thermosetting binder of the powder composition is an amino resin.

8. The method according to claim 1, wherein the thermosetting binder of the powder composition is a melamine formaldehyde resin, a urea formaldehyde resin, or a phenol formaldehyde resin.

9. The method according to claim 1, wherein the powder composition comprises one or more of various fibre components, resins, pigments, binders, and fillers such as barium sulphate, various types of kaolin clay, talcum or chalk.

10. The method according to claim 1, wherein the fluid composition is applied by printing, digital printing, spraying or spraying through a template.

11. The method according to claim 1, wherein the powder composition comprises one or more of cellulose fibres, a melamine-formaldehyde resin, colour pigments, and/or metal oxides such as, e.g., $Al_2O_3$.

12. The method according to claim 1, wherein the powder composition is applied onto the at least one surface of the object by scattering, printing or spraying.

13. A method for modifying the degree of gloss of a surface, the method comprising the steps of:
   i) providing a sheet or a carrier impregnated with a thermosetting binder;
   ii) applying a fluid composition onto the sheet or carrier;
   iii) applying the resulting sheet in ii) onto a surface of an object;
   iv) optionally heating the resulting surface of the object in step iii);
   v) applying heat and pressure to the resulting surface of the object in iii) or iv) with a pressing device at a pressing temperature,
   wherein the fluid composition is uncolored and has a boiling temperature that is higher than the pressing temperature.

14. The method according to claim 13, wherein the sheet is a paper or cellulose based sheet, a sheet based on a polymeric material or any combinations thereof.

15. The method according to claim 13, wherein the pressing device is a continuous pressing device or a static pressing device.

16. The method according to claim 13, wherein the pressing step takes place under a temperature of about 120° C. to about 250° C.

17. The method according to claim 13, wherein the pressing step employs a pressure of about 10 bar to about 90 bar.

18. The method according to claim 13, wherein the pressing step has a duration of about 1 second to about 120 second.

19. The method according to claim 13, wherein the fluid composition is a monoethylene based fluid or a water based ink composition.

20. The method according to claim 13, wherein the fluid composition is applied by printing, digital printing, spraying, or spraying thorough a template.

21. The method according to claim 13, wherein the optional heating step is performed by employing IR radiation or blowing with a heated air stream.

22. The method according to claim 13, wherein the method comprises creating a matt or lusterless surface on an area of the surface to which the fluid composition has been applied, wherein areas on which no fluid composition has been applied appear glossy.

23. The method according to claim 13, wherein the surface of the pressing device is completely unstructured or contains various degrees of structure.

24. An object obtainable by the method according to claim 13.

25. The object according to claim 24, wherein the object comprises an essentially plane surface.

26. An object comprising at least one surface which further comprises a pressed powder wherein a fluid composition is encapsulated and wherein the area comprising the encapsulated fluid gives a matt or lusterless appearance to the surface, wherein the matt or lusterless appearance has a gloss level of less than 10 GU, measured using the 85° angle on a glossmeter, wherein the fluid composition is uncolored and has a boiling temperature that is higher than a pressing temperature.

27. The object according to claim 26, wherein the object comprises an essentially plane surface.

28. The method according to claim 1, wherein a fluid composition is encapsulated in the pressed surface, and wherein an area comprising the encapsulated fluid gives a matt or lusterless appearance to the pressed surface, wherein the pressed surface, wherein the matt or lusterless appearance has a gloss level of less than 10 GU, measured using the 85° angle on a glossmeter.

29. The method according to claim 13, wherein a fluid composition is encapsulated in the pressed surface, and wherein an area comprising the encapsulated fluid gives a matt or lusterless appearance to the pressed surface, wherein the pressed surface, wherein the matt or lusterless appearance has a gloss level of less than 10 GU, measured using the 85° angle on a glossmeter.

30. The method according to claim 1, wherein the fluid composition is a monoethylene based fluid.

31. The method according to claim 13, wherein the fluid composition is a monoethylene based fluid.

32. The method according to claim 13, wherein the fluid composition is transparent.

* * * * *